United States Patent [19]

Oberg

[11] Patent Number: 4,586,612
[45] Date of Patent: May 6, 1986

[54] APPARATUS TO PRODUCE SHINGLES

[75] Inventor: Hans Oberg, Surrey, Canada

[73] Assignee: Vanguard Properties Co., Winlock, Wash.

[21] Appl. No.: 600,897

[22] Filed: Apr. 16, 1984

[51] Int. Cl.$^4$ .................................................. B07C 5/00
[52] U.S. Cl. .................................... 209/555; 198/420;
198/453; 198/456; 209/603; 209/643; 209/934
[58] Field of Search ............... 209/509, 517, 518, 520,
209/552, 555, 576, 586, 600, 603, 625, 627, 643,
914, 922, 934, 556; 198/420, 434, 444, 453, 456,
461, 491

[56] References Cited

U.S. PATENT DOCUMENTS

| | | | |
|---|---|---|---|
| 2,611,471 | 9/1952 | Johansson et al. | 198/444 |
| 2,933,185 | 4/1960 | Coleman et al. | 209/586 |
| 3,080,042 | 3/1963 | Sherman | 198/491 |
| 3,562,070 | 2/1971 | Adams et al. | 144/13 |
| 3,621,998 | 11/1971 | Prochaska | 209/552 |
| 4,030,607 | 6/1977 | Suda et al. | 209/555 |
| 4,203,694 | 5/1980 | James | 198/434 |
| 4,325,421 | 4/1982 | Janovick et al. | 198/624 |

Primary Examiner—Robert B. Reeves
Assistant Examiner—Donald T. Hajec
Attorney, Agent, or Firm—Townsend and Townsend

[57] ABSTRACT

Apparatus to move rectangular blanks from a receiving station to a loading station position. The apparatus has a support framework and a driven track to move the blanks from the receiving station towards the loading station. A feed station receives the blanks. Alignment devices in the feeding station position a blank. A blank is prevented from moving along the feed station while a further blank is being aligned. A separator separates the stacked blanks and a scanner system detects blanks of a predetermined width. A magazine stores blanks detected by the scanner system. Blanks detected by the scanner system can be moved from the track to the magazine. An end stop is on the track and a transfer device, over the track, before the end stop, receives a course of blanks. A scanner system, remote from the end stop, determines how a partially formed course of blanks should be completed. A transfer device removes a blank from the magazine to the track if the last mentioned scanner system indicates a blank of predetermined width is required to complete the course. A further scanner indicates a full course of blanks beneath the second transfer device and controls the transfer of a course of blanks to the loading station.

22 Claims, 25 Drawing Figures

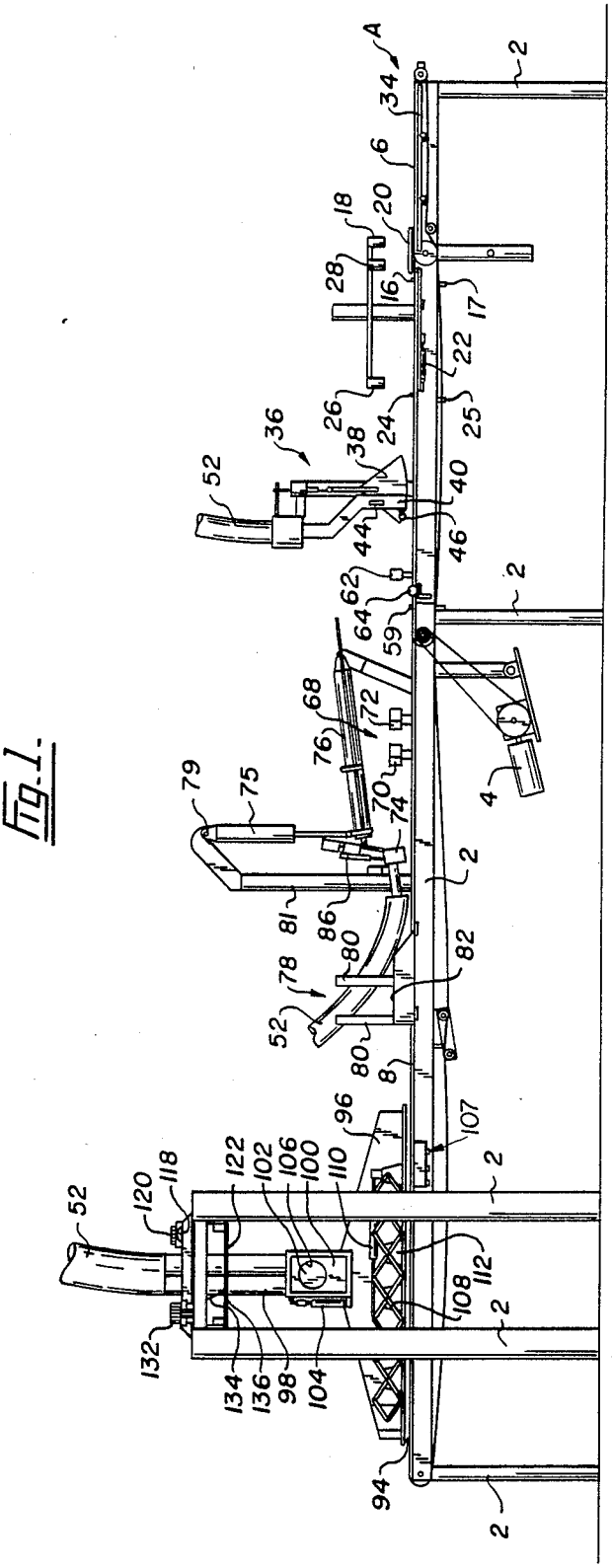

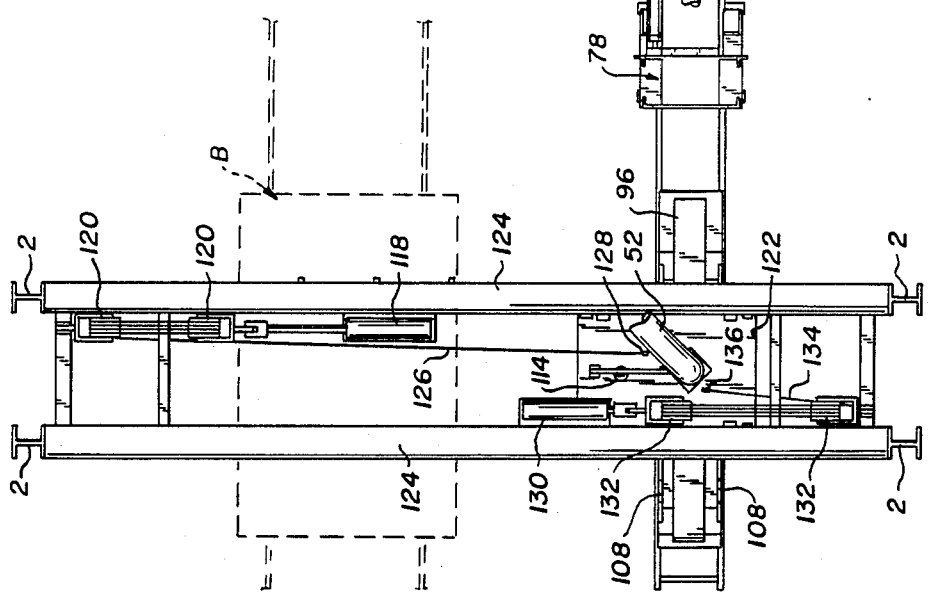

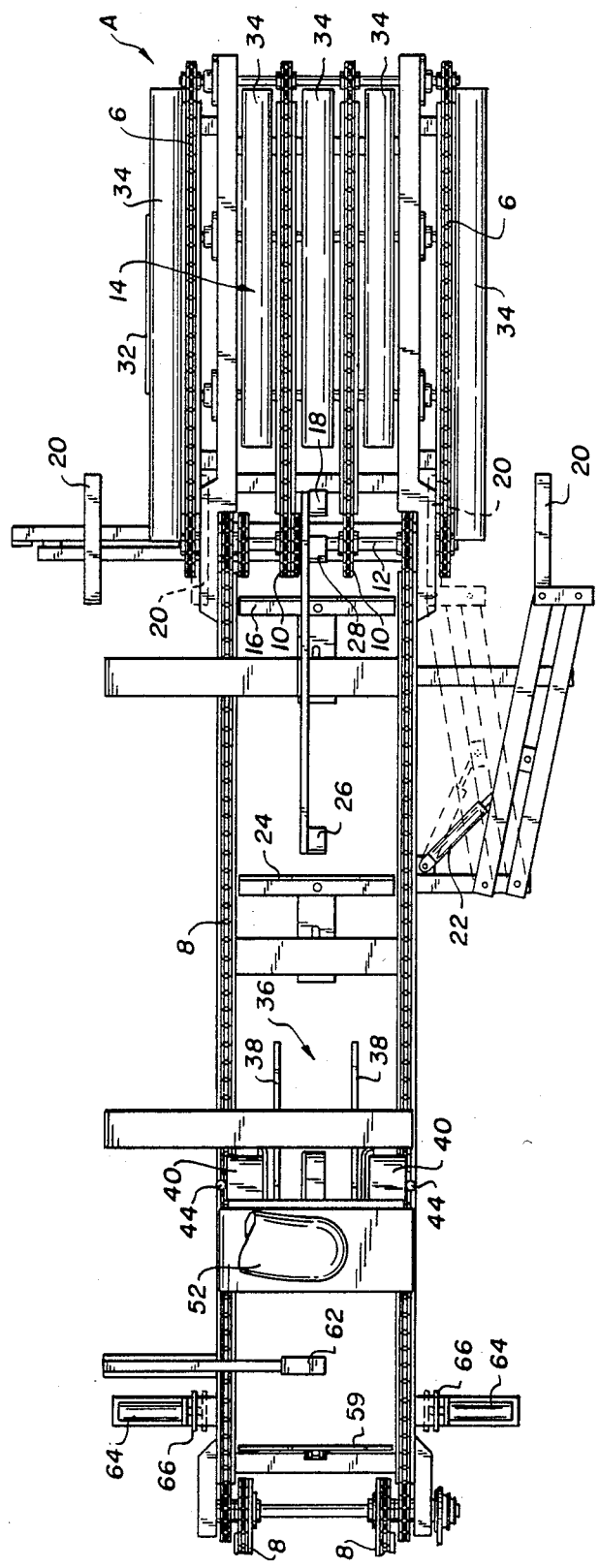

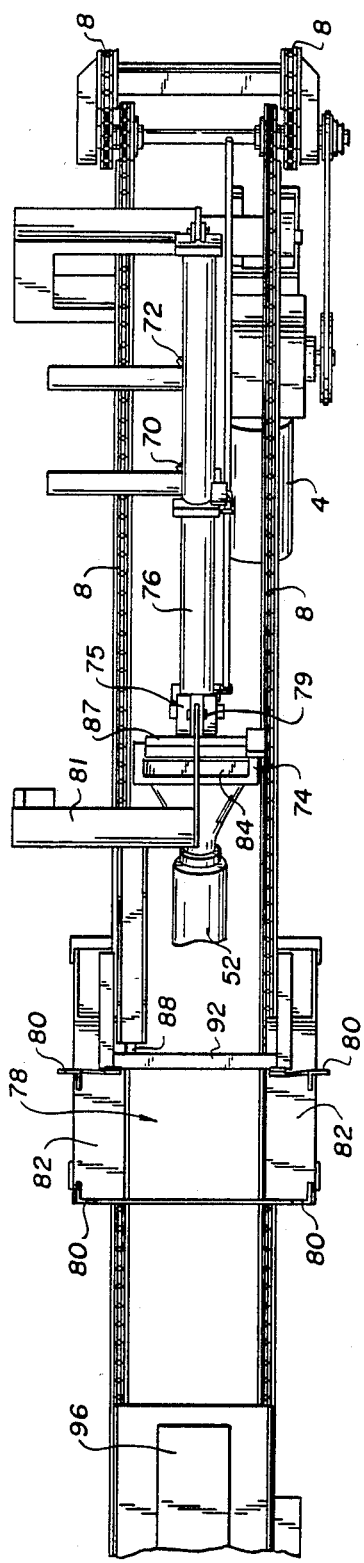

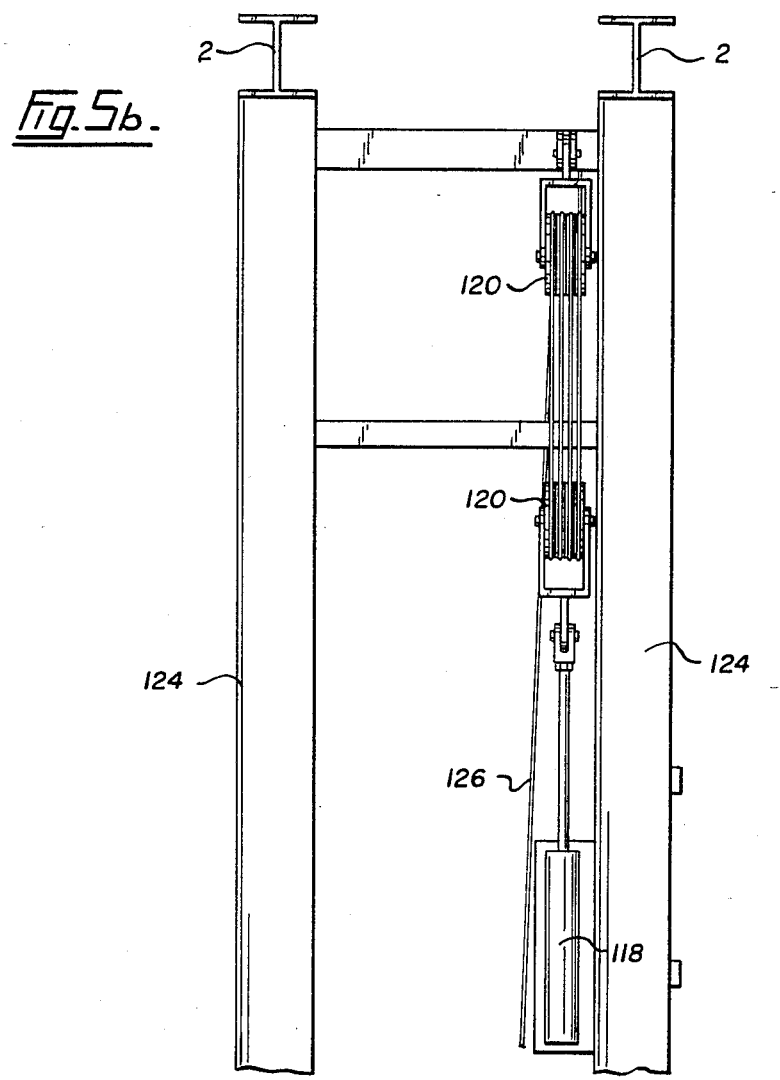

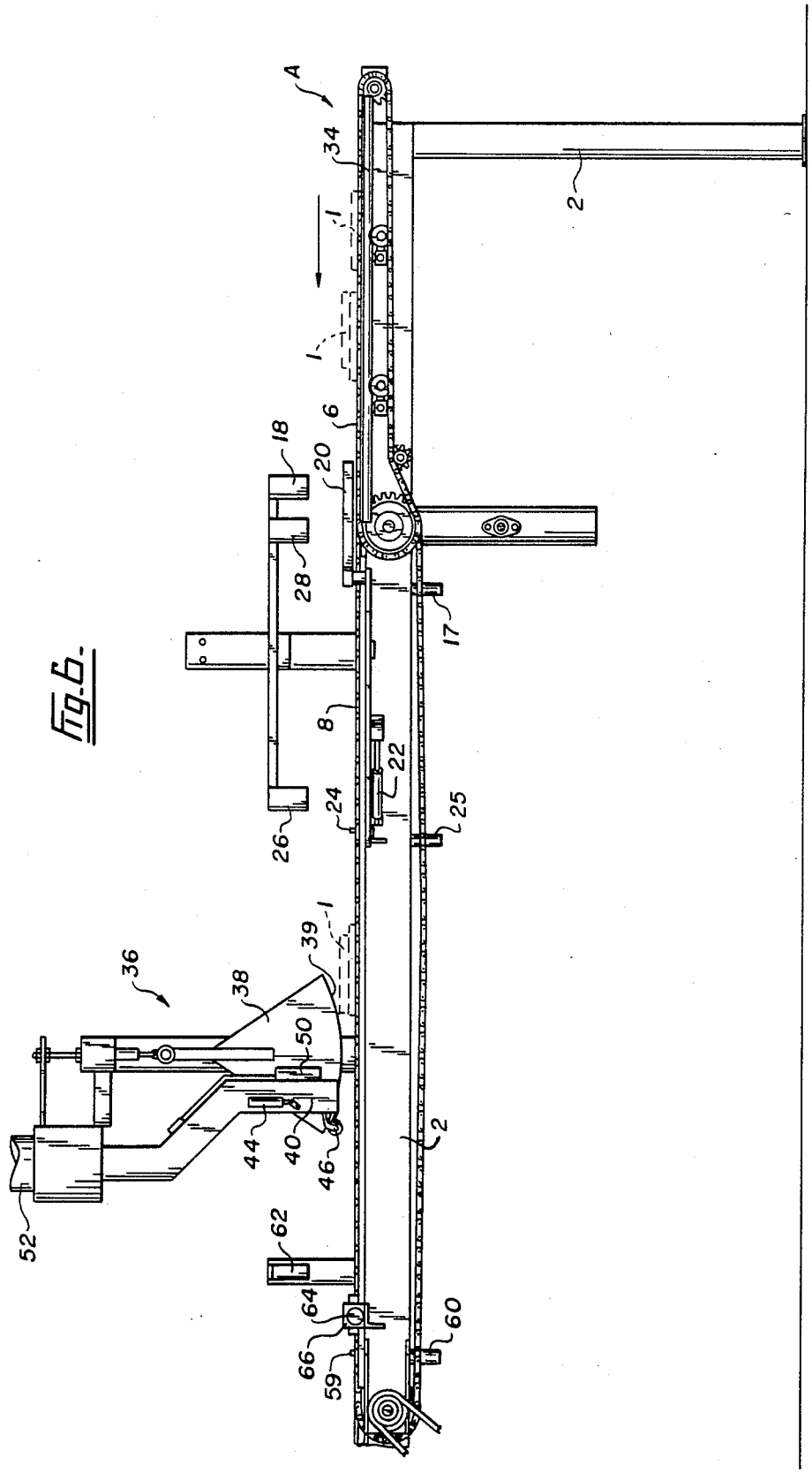

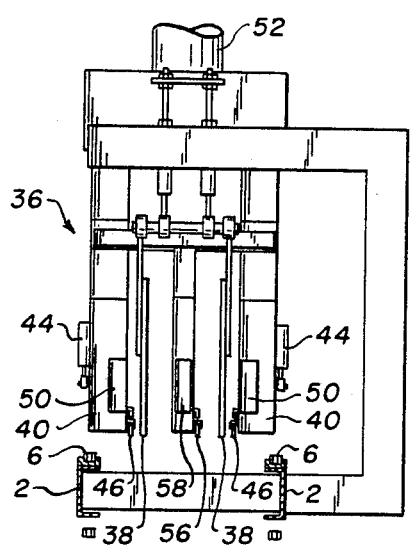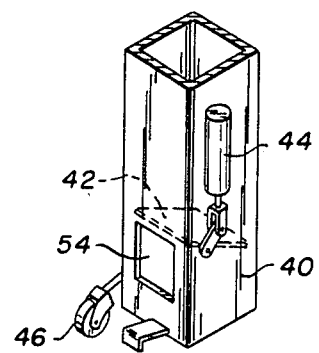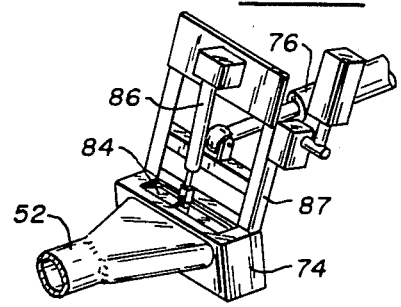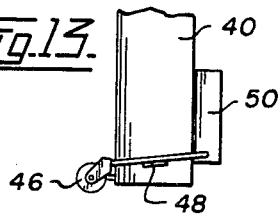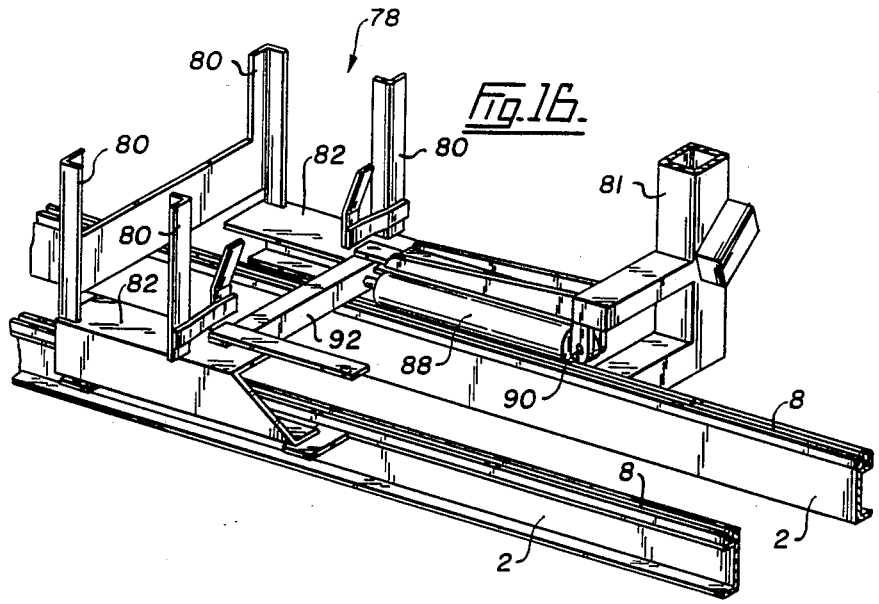

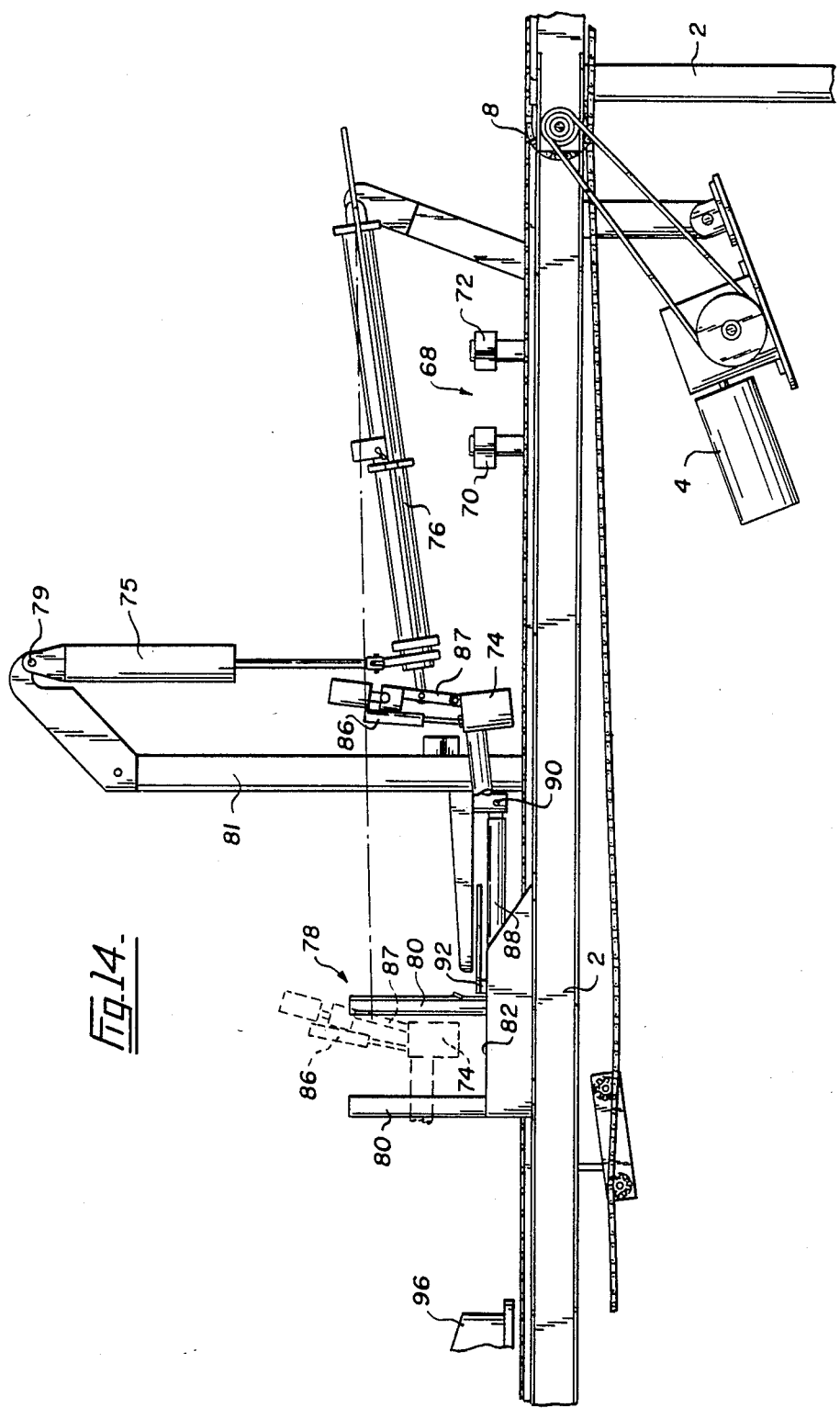

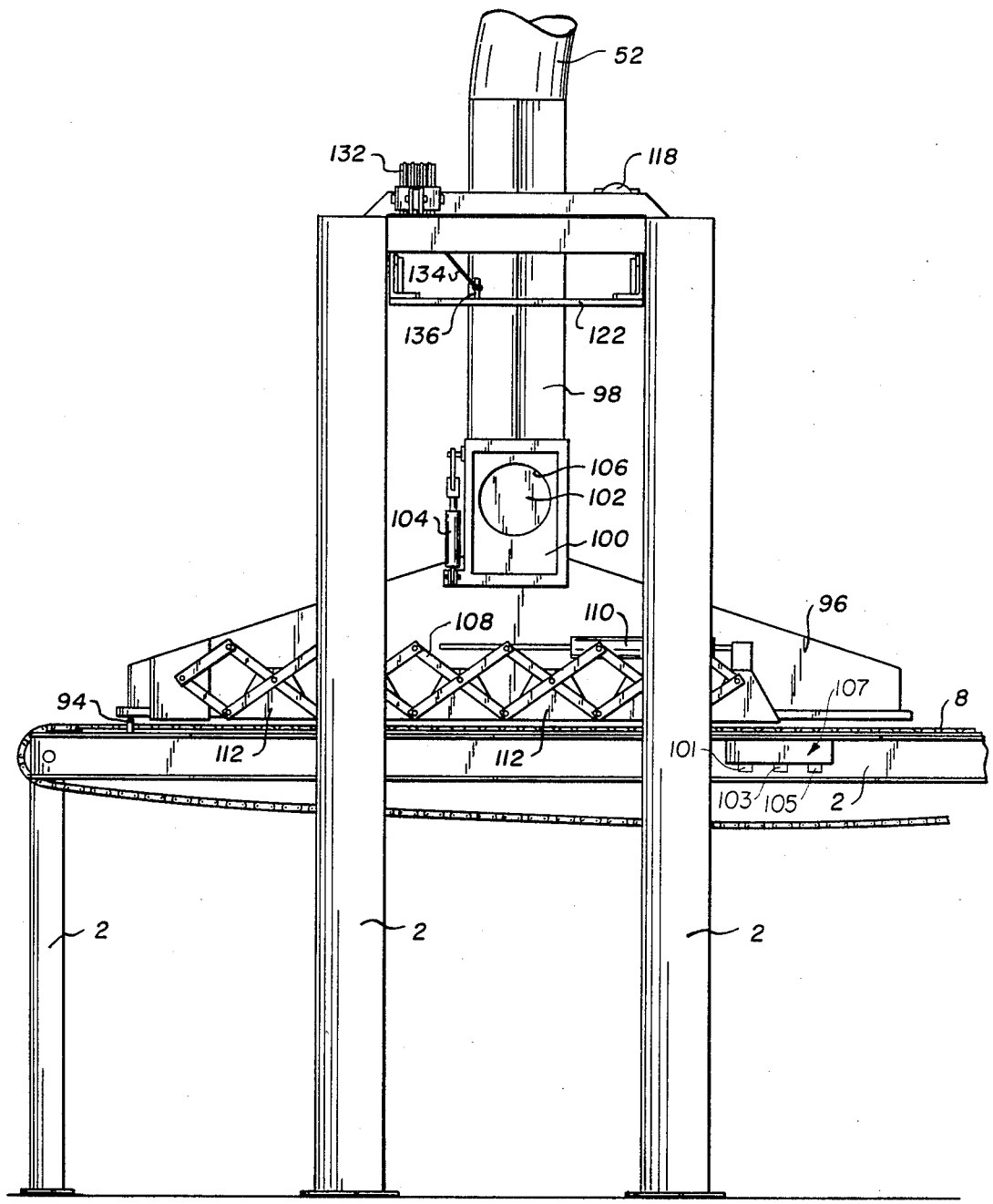

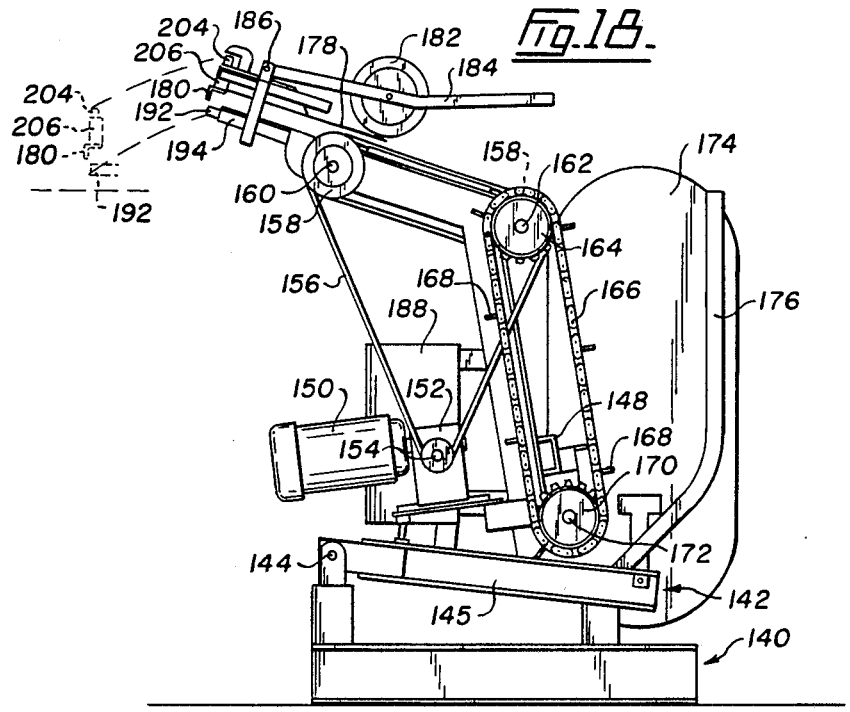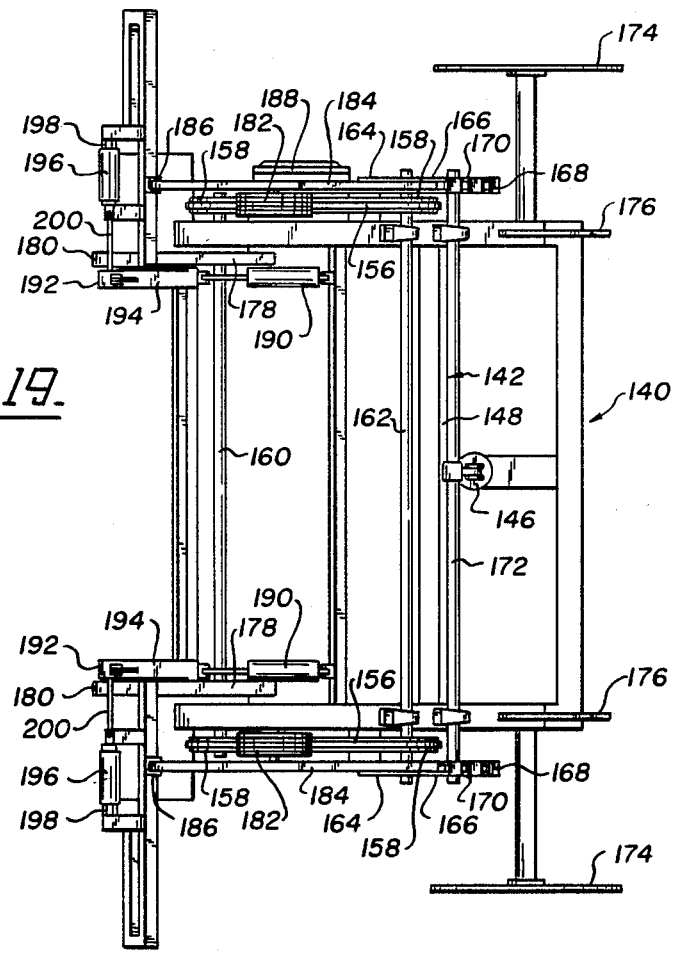

APPARATUS TO PRODUCE SHINGLES

FIELD OF THE INVENTION

This invention relates to an apparatus, useful in the production of shingles, for moving rectangular blanks from a receiving to a loading position.

DESCRIPTION OF THE PRIOR ART

Shingles, usually of cedar, are still widely used on the exteriors of houses, particularly on the roofs. Because of their attractive appearance they are also used on interior walls of houses. However their principal use is for roofing and cedar shingles are still regarded as the preferred roofing material in North America.

The present most popular method of producing shingles is of considerable antiquity. Blocks enter a blank sawing floor on a block conveyor. The blocks are lifted from the conveyor by grade and placed on a block table, near a head saw upon which the shingle is produced.

The shingle sawyer places the block into his head saw turning the block around a vertical axis to assure that as much edge grain as possible is displayed on the shingles to be cut. Edge grain is obtained by sawing at right angles to the year rings and will produce a better grade of shingle. Cutting parallel to the year rings produces flat grain which is considered an inferior grade of shingle so that cutting in this direction is normally avoided as much as possible.

Shingles are cut from the blocks by the head saw. Of the four sides of each shingle only the sides along the thin tip and along the thick butt are straight and parallel to each other. They are the original cuts formed when the blocks were cut from the log. The other two sides have to be trimmed by the sawyer with a jointer saw in such a way that these two sides will be parallel and at right angles to the other two sides. When this is accomplished the sawyer slides the finished shingles by grade down various chutes to a packer who will put the graded shingles into bundles, either for the marketplace or for kiln drying. For the group destined for the marketplace the fabrication process has ended.

For the group to be kiln dried, which is the first step in the remanufacturing of shingles, the bundles are hand-loaded on to pallets to form pallet loads for the kiln. After drying in the kiln the bundles are hand-loaded from the pallet onto groover conveyors for remanufacturing. A man on each groover machine will take the shingles from the dried bundles one by one, place them on a feed table and hand-feed them into the machines. The packer at the end of each machine will form bundles from the finished shingles and put the finished bundles into cardboard boxes ready for the marketplace.

There have been attempts to decrease the labour intensity of the above process. Thus Janovik in U.S. Pat. No. 4,325,421 discloses a method and apparatus for cutting and trimming shingles. A clamped block is conveyed to cause relative movement between two cutting means that are inclined relative to one another, first to cut a shingle from the block tapering in one direction and secondly to make a cut tapering the opposite direction. However Janovik is essentially concerned with the formation of the shingle, that is it is directed to only one step in the shingle production.

Daniels in U.S. Pat. No. 3,754,586 discloses a process and an apparatus in which a first full length diagonal cut is made in a block, a kerf is cut partway into the block to make a first kerf and than a diagonal cut is made all the way through the block to produce a triangular wood piece with a kerf cut halfway through the thin side. The block is then split along the plane of that kerf to form two shakes. However again Daniels is of course concerned with the actual formation of the shingle, that is he is mechanizing only one step the production of shingles.

Adams et al in U.S. Pat. No. 3,562,070 discloses a shingle handling apparatus useful only with a formed shingle rather than an apparatus useful in the formation of shingles.

The above prior art indicates generally that there has been considerable efforts to mechanize the production of shingles yet the old labour intensive method is still the only practised method in North America.

SUMMARY OF THE INVENTION

The present invention seeks to reduce the heavy labour content in shingle production and is an apparatus to feed blanks for shingle production to the kiln for drying. In particular the present invention greatly reduces the amount of labour required in shingle production. For the moment at least until feeding the shingles into the kiln the labour required will be to lift the blocks by grade out of a block conveyor and sawing to make the necessary cuts. However in the apparatus of the present invention the sawyer does not cut shingles but blanks of a rectangular cross section, generally blanks from which two shingles can be cut by a diagonal end to end cut.

Accordingly, the present invention is an apparatus to move rectangular blanks from a receiving to a loading position, the apparatus comprising a support framework; a driven track to move the blanks from the receiving station towards the loading station; a feed station to receive the blanks; alignment means in the feeding station to position a blank; means to prevent a blank moving along the feed station while a further blank is in the alignment means; a separator to separate the stacked blanks; a first scanner to detect blanks of greater than a predetermined width; a magazine to store blanks detected by the first scanner; first transfer means to move blanks detected by the first scanner from the track to the magazine; an end stop on the track; second transfer means over the track, before the end stop, and dimensioned to receive a course of blanks; a third scanner, remote from the end stop to determine how a partially formed course of blanks should be completed; third transfer means to remove a blank from the magazine to the track if the third scanner indicates a blank wider than the predetermined width is required to complete the course; a fourth scanner to indicate a full course of blanks beneath the second transfer means; and means responsive to the fourth scanner to move the second transfer means to transfer a course of blanks to the loading station.

BRIEF DESCRIPTION OF THE DRAWINGS

Aspects of the invention are illustrated, merely by way of example, in the accompanying drawings in which:

FIG. 1 is a side elevation of an apparatus according to the present invention;

FIG. 2 is a plan view of the apparatus according to the present invention;

FIG. 3 is a detail of the leading part of the apparatus according to the present invention;

FIG. 4 is a detail of a subsequent part of the apparatus;

FIG. 5a and 5b have plan views of part of the apparatus;

FIG. 6 is a plan view of FIG. 3;

FIGS. 11 to 15 show details of the separator;

FIG. 16 illustrates the magazine;

FIG. 17 is a side elevation of part of the apparatus able to transfer blanks to the loading position;

FIG. 18 is a side elevation of a separator inserter, useful at the loading station;

FIG. 19 is a plan view of the inserter of FIG. 18;

DESCRIPTION OF THE PREFERRED EMBODIMENTS

Figure 7:
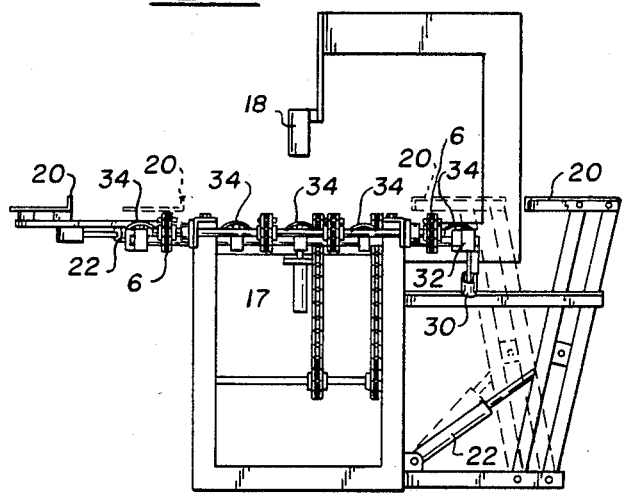
FIG. 7 is an end elevation of the apparatus according to the present invention.

The drawings show an apparatus to move rectangular blanks—see FIG. 6—from a receiving position A to a loading position B. The apparatus comprises a support framework, generally of I-beams 2 and a driven track to move the blanks from the receiving station A towards the loading station B. The driven track comprises two chain systems driven by a common electric motor 4. As illustrated particularly in FIGS. 3 and 6 the first chain system 6 in the loading position is driven more slowly than the second subsequent chain system 8 by the selection of different sized sprockets 10 on cross shaft 12. The loading position A has a feed station 14 to receive the blanks 1. The feed station has alignment means to position the blank. In the illustrated embodiment the alignment means comprises a stop 16 reciprocable by cylinder 17 from a position where it blocks the track 6 by extending across the track to a position below the track 6. There is a scanner 18 to detect the presence of a blank 1 and there are side members 20, as shown particularly in FIGS. 2, 3 and 7 to move inwardly to align the sides of a blank 1 when its leading edge is stopped, and thus aligned, by projecting stop 16. Side members 20 are reciprocated by cylinders 22.

Because blanks over a certain width cannot be straightened at the first stop 16 a second stop 24 operable by cylinder 25 is provided downstream of the first stop 16 and on the second chain 8. A scanner 26 detects the approach of blank 1 and a signal is sent to elevate stop 24 by cylinder 25. When the blank passes, scanner 26 sends a further signal to cylinder 25 to retract stop 24.

Figure 8:
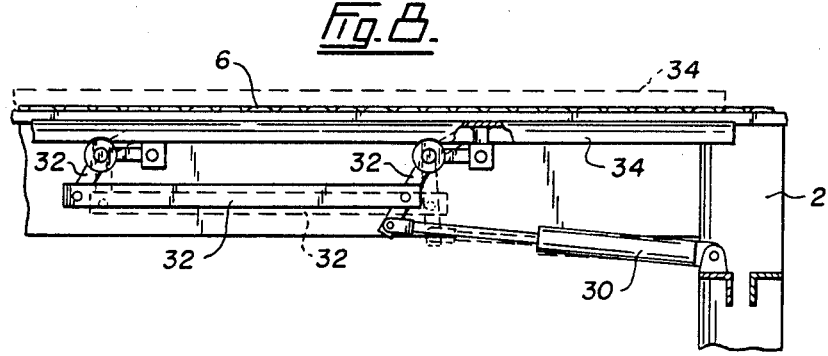
FIG. 8 is a side elevation corresponding to FIG. 7.
Figure 9:
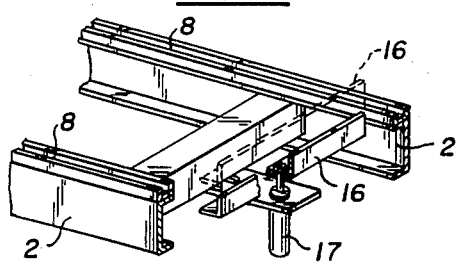
FIGS. 9 and 10 show track details.
Figure 10:
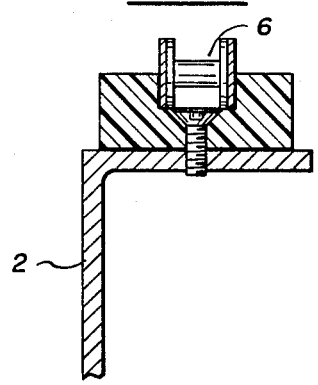

The apparatus has means to prevent blanks moving along the feed station 14 while one blank 1 is being aligned. This avoids crowding of the blanks and, of course, avoids a second blank approaching the alignment means while a blank is being aligned. In those circumstances the second blank may ride over the blank being aligned and not be aligned itself. Thus in the present apparatus there is a scanner 28 to show that a blank is present in the alignment section. A signal is sent from this scanner to a cylinder 30—see FIG. 8. The cylinder 30 is connected by lever 32 to arcuate members 34 to reciprocate from a rest position, shown in FIG. 7 below the first chain, to a raised position above the first chain—shown in broken lines in FIG. 8. When the scanner 28 detects the presence of a blank at the first stop 16 a signal is sent to the cylinder 30 which moves the levers 32 to raise the arcuate members 34 to lift blanks in the feed section out of contact with the first drive chain 6. When the scanner 28 indicates that no blank is present in the alignment section the members 34 descend and the first chain continues to move blanks in the feed section towards the alignment section.

In the present invention all scanners simply comprise a photo-electric sensor spaced apart from a light source. As is conventional, the presence of an article between the source and the sensor cuts off the light and the appropriate signal is sent from the sensor.

There is a separator 36 to separate stacked blanks. In the loading of blanks onto the feeding section by hand most of the time blanks will be fed one on top of the other. These blanks are separated in separator 36. As shown in FIGS. 1, 6 and 11 the separator comprises a freely suspended pair of members 38, each having a generally arcuate lower surface 39 tapering from a leading edge high point to a low point that is spaced from the chain 6 an amount equal to the width of two blanks 1. There are retaining means adjacent the freely suspended members 38 that comprises a source of suction in header 40. There is a flap valve 42 controlled by a cylinder 44 whose operation is tripped by height sensing arms 46 positioned at such a height as to be able to detect the presence of a blank stacked on another blank. Stop 48 fixes the rest position of the height sensing arms 46 whose controls are in box 50—see FIG. 13. When one blank stacked on another is detected the appropriate signal is sent to the cylinder 44 which operates the flap valve 42 in the header which connects the bottom end of the header with a source of suction (not shown) through pipe 52. The flap moves down to close an opening 54 in header 40 and the suction is sufficient to hold the upper blank while the lower blank passes through on the chain 6. The operation is such that when the lower blank has passed by header 40 the upper, retained blank is released by a signal sent to the cylinder 44 to return the flap valve 42 to the position shown in FIG. 12 where suction in the bottom of the header is eliminated by the provision of the opening 54 to atmosphere. Vacuum or suction is maintained above flap valve 42 within header 40. The necessary signal is generated by a blank at the third stop, described below.

Overly wide blanks and narrow blanks are not always picked up well by the header 40. Overly wide blanks are picked up with an excessive amount overlapping so that they tend to cantilever down under their own weight and free themselves from the suction. Narrow blanks permit escape of air so that the necessary suction to hold the blanks in place is not developed. This is avoided by the provision of a further height sensing arm 56 with control 58. Height sensing arm 56 is set at a fixed distance from and between height sensing arms 46 and upstream of arms 46. When a narrow blank passes through the equipment before it reaches arms 46 it has dropped off arm 56 and is then picked up in normal manner by operating arm 46 as described above. However when an overly large or wide blank appears the downstream arms 46 are not operated until they are raised and the arm 56 released. This ensures that the suction is not applied until the blank is properly positioned beneath the header 40.

The suction throughout the machine may be provided by, for example, a 30 HP motor driving a fan to evacuate the air from the piping system in which pipes 52 are fed to the appropriate places in the apparatus.

There is a third stop 59 in the track immediately beyond the separator 36. Stop 59 is moved by cylinder 60. Just before the stop is a scanner 62 to sense the presence of a blank. There are pneumatic cylinders 64 on each side to operate pushers 66 so that the blank can be squared up. This avoids the problem that the separator will occasionally spoil the position of the blanks in their alignment as fixed by the first alignment means. The necessary minor adjustment is carried out by the third stop and ensures that feed to the subsequent magazine is of aligned blanks. Scanner 26 also acts to signal movement of flap valve 42 to release a retained blank.

There is a scanner system 68 arranged downstream of the separator 36 to detect blanks of a particular predetermined width. The scanner system 68 comprises a downstream scanner 70 and an upstream scanner 72 spaced by an amount slightly greater than the predetermined width that is required. That is a blank that can trip both scanners 70 and 72 is shown to be of the predetermined, desired width.

When a signal is received from the system 68 indicating the presence of a blank of the predetermined width movable suction box 74 attached by suction pipe 52 to a source of suction picks up the blank. The suction box 74 is then moved longitudinally by cylinder 76 and raised by cylinder 75 to place the blank in a magazine 78 that simply comprises support members 80 with a base 82 raised above the chain 8. By this means a supply of blanks of the predetermined size is formed in the magazine 78. The cylinder 75 is mounted pivotally at 79 in stand 81. Suction box 74, as shown particularly in FIG. 15 comprises a flap valve 84 mounted in box 74 and operated by pneumatic cylinder 86. A frame 87 is attached to allow pivotal attachment of cylinders 86 and 76. Flap 84 is closed by cylinder 86 and the suction box 74, with the blank attached, is then raised under the influence of cylinder 75 and moved longitudinally under the influence of cylinder 76 and lowered into magazine 78, at the position shown in broken lines in FIG. 14.

Feed out of the magazine, to be described later, is by pneumatic cylinder 88 mounted at 90 and acting to push abutment member 92. The arrangement is shown most clearly in FIG. 16.

Those blanks not collected into magazine 78 move along the track to be stopped, as shown in FIG. 1 and in FIG. 17, at the end of the track by stop 94 beneath a suction chamber 96. Suction chamber 96 comprises a hollow body connected by suction pipe 52 to a source of suction attached to column 98. The upper end of the chamber 96 has a chamber 100 including a flap valve 102 operated by a pneumatic cylinder 104 so that the suction may be applied either to the interior of the chamber 96 or simply contained. The exterior of the chamber 96 is provided with a lazy tongs 108, moved by cylinders 110 (one on each side of chamber 96) acting as a means to space the blanks on the track beneath the suction chamber 96.

There is a sensor system 107 adjacent one end of the suction chamber 96 positioned in such a way that when a certain number of blanks are positioned beneath the suction chamber the sensor 101 will tell whether one blank of greater than the predetermined width or two normal blank are required. The arrangement requires two further sensors 103 and 105. If only the downstream sensor 103 of these two snesors is activated then a signal is sent indicating that one blank of the predetermined width, stored in magazine 78, is necessary to complete the load beneath the suction chamber 96. At this time, pneumatic cylinder 88 is activated to push out of the magazine 78, such a blank of the predetermined width which then moves into position to complete a course of blanks beneath the suction chamber 96. If both sensors 103 and 105 are activated simultaneously then a signal is sent indicating that the course of blanks beneath the suction chamber 96 is complete.

When a complete course is beneath the suction chamber 96 a pneumatic cylinder 104 is activated to move flap 102 to close the outlet 106, that is to apply suction to the suction chamber 96. All the blanks are then held in position against the suction chamber 96. At this time a signal is sent to pneumatic cylinders 110 to extend the tongs 108, formed on the outside of the suction chamber 96 and anchored to slidable shoes 112. In this way the blanks are arranged at regular intervals to occupy all the available space beneath the suction chamber 96.

Figure 5A:
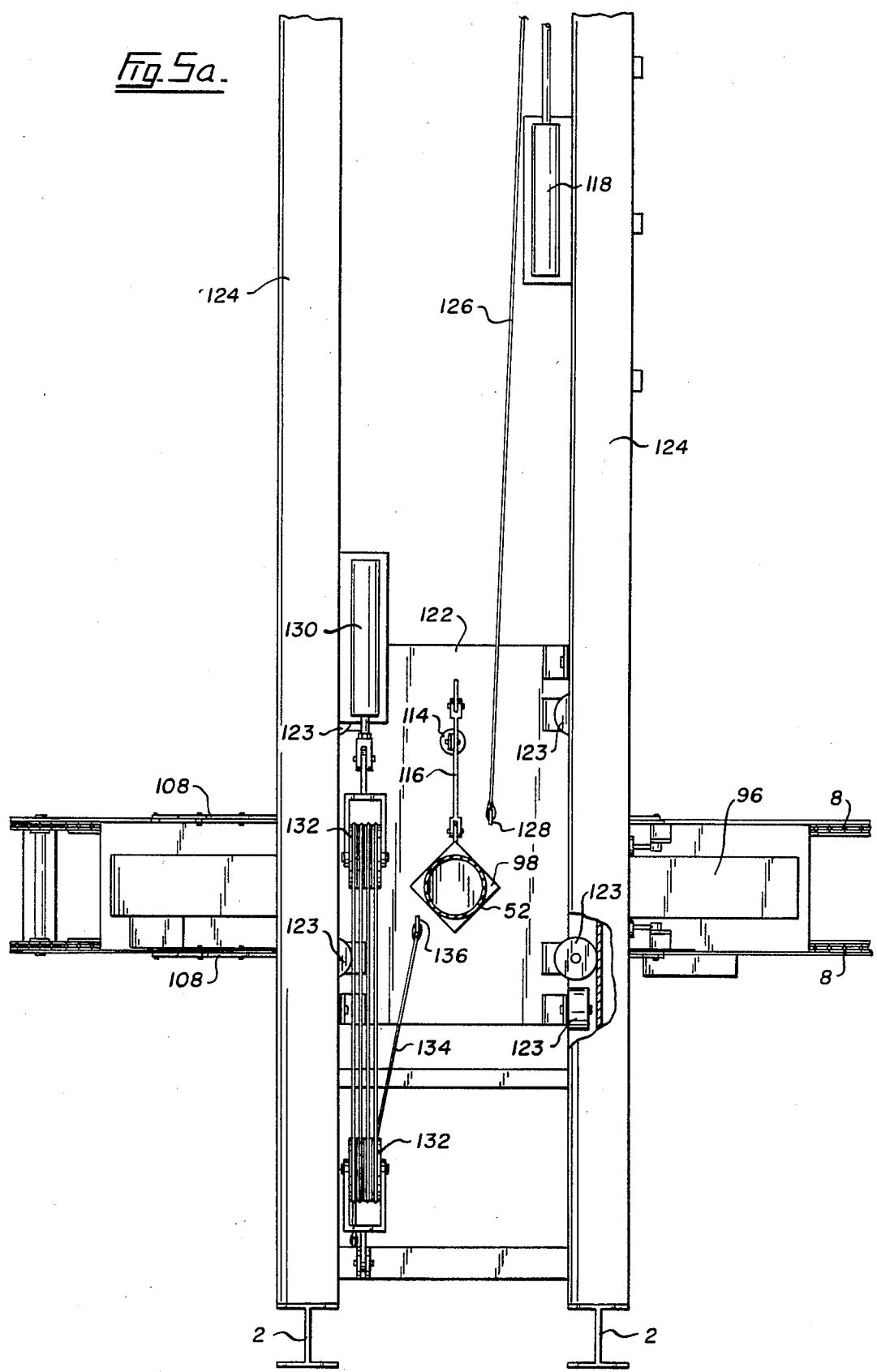

The suction chamber 96 is then raised under the influence of cylinder 114 acting through lever 116 attached to column 98. When the appropriate height is reached a limit switch is activated and hydraulic cylinders 118, acting through two sheave blocks 120 moves carriage 122, carrying the suction chamber 96, across a track 124 shown most clearly in FIGS. 5a and 5b. FIG. 5a illustrates that the track upon which the carriage moves is perpendicular to the chain systems 6 and 8. The carriage 122 is provided with wheels 123 which permit both movement of the carriage and alignment of the carriage, as shown particularly in FIG. 5a where wheels 123 are shown in pairs at each corner of the carriage 122, the wheels of each pair being at right angles to each other. A first line 126 is anchored in the carriage of 128 and passes over blocks 120.

The carriage 122 follows a predetermined sequence of movement. A first or near course of blanks is laid down in one position. When the carriage is in that position the suction to the suction chamber is released and the blanks deposited, for example on a pallet. Under the influence of the cylinder 130, acting through sheave blocks 132 and line 134 anchored at 136, the carriage is moved back so that the suction chamber 96 again assumes the position shown in FIG. 1, that is ready to receive another course of blanks. Suction chamber 96 then moves back, once full, places a second course of blanks remote from the first and further away but at the same level. When this is completed the suction chamber moves back to collect the third course and deposit that so that its edges are located on the upper edges, of the first and second courses. Sticks or separators are placed at each side of the third course on the first and second courses, and spaced outwardly from the third course. Such an action may be carried out by hand but is desirably carried out by an apparatus to be described later. This procedure is repeated until a finished load of blanks is mounted on the pallet. It will be appreciated that there are substantial air spaces between each course and its neighbouring courses.

FIGS. 18 to 21 illustrate an apparatus able to insert sticks or separators automatically between the blanks to enable improved drying in the kiln.

The illustrated apparatus comprises a lower frame 140 and an upper frame 142. The upper frame 142 is pivotally mounted to the lower frame at 144. Both frames are made of conventional metal beams 145.

Figure 20:
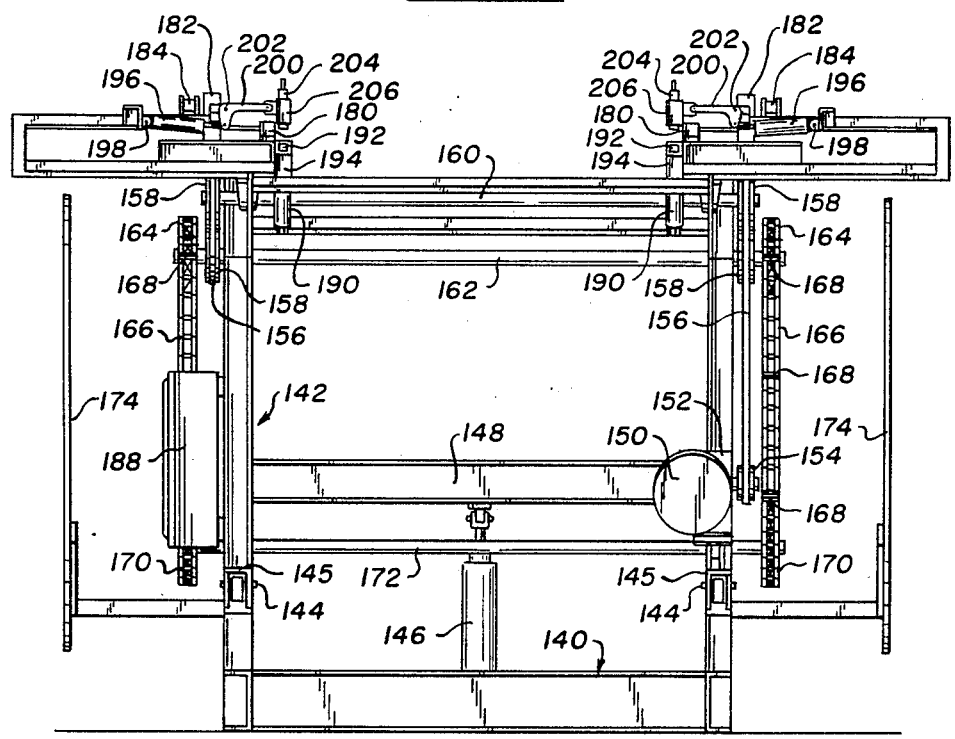
FIG. 20 is a front elevation of the inserter.

As shown particularly in FIG. 20 the upper frame 142 is pivoted relative to the lower frame 144 by the action of pneumatic cylinder 146 attached to a cross bar 148 on the upper frame 142.

Drive is provided by an electric motor 150 driving through gear box 152. The gear box 152 has an output drive pulley 154 to drive an endless belt 156 extending over upper pulleys 158. Drive is transmitted from these pulleys to corresponding pulleys 158 on the other side through cross shafts 160 and 162. The cross shaft 162 also carries sprockets 164 driving chains 166 fitted with lugs 168. Idler sprockets 170 locate the chains at the lower end of the apparatus. Shaft 172 carries sprockets 170.

The apparatus includes a magazine formed by end walls 174 and back members 176. Sticks to be inserted between courses of blanks are placed in the magazine. Lugs 168 on the chains 166 then raise the sticks from the magazine upwardly to deposit the sticks on the belts 156 at the top of the apparatus. Sticks move along the belts 156 to proceed under guide members 178. Progress is stopped by stops 180. Large wheels 182 are mounted on bars 184 pivotally mounted at 186 to act as brakes to prevent sticks that have been loaded from slipping back down the inclined belt 156 see FIG. 18. The equipment is provided with scanning means (not shown), such as a photo electric eye, to determine when the upper surface of the belt 156 is full. At that stage a message is sent to the motor 150 and the machine is stopped. It is restarted when the eye senses the absence of sticks at the scanned part of the upper surface. The controls of the machine are mounted in box 188 shown particulary in FIGS. 18 and 20.

Figure 21:
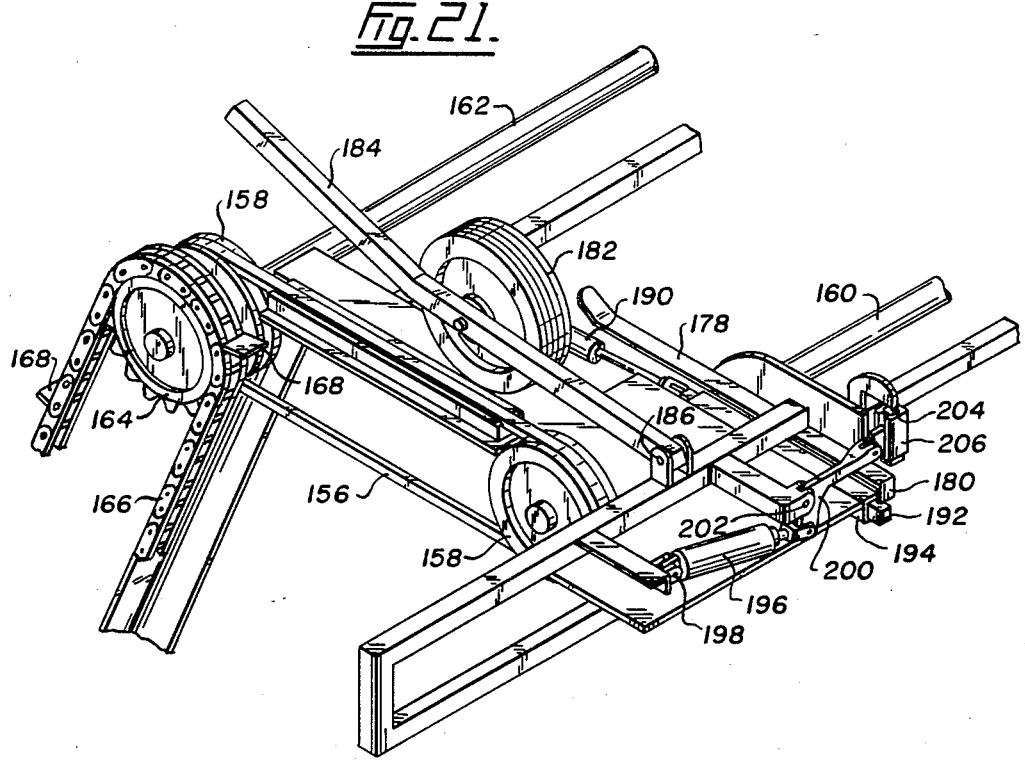
FIG. 21 is a detail of the inserter.

FIG. 21 illustrates most clearly the details of the means whereby the sticks are fed from the apparatus. Pneumatic cylinders 190 aligned generally parallel to belts 156 are attached to rods 192 mounted in housings 194. These rods 192 form a base for the sticks resting against stops 180.

Retraction of the pneumatic cylinders 190 pulls away the rod 192, allowing the stick to fall. At the same time cylinders 196 aligned generally parallel to cross shaft 160 and pivotally mounted at 198 operate link 200 pivotally mounted at 202 to raise and lower rods 204 mounted in housings 206. These rods 204 can be used to force sticks downwardly.

In operation the apparatus of FIGS. 18 and 21 is pivoted by cylinder 146 to a position shown in part in broken lines in FIG. 18 above a pallet. At that position a stick is ejected by activating pneumatic cylinders 190 and 196 to sit one on each side of a course of blanks. In general one piece of apparatus as illustrated in FIG. 18 will be positioned on each side of the pallet, that is one piece of apparatus places sticks on one side of each course of blanks.

In a preferred embodiment the pallet is mounted on a hoist which remains in one position until a complete load of three courses of blanks is deposited. A sensor, for example, a photo-electric eye, senses when three courses have been laid and the hoist is then lowered. The arrangement ensures that the carriage unloads at a constant height.

The operation of the device has been described above generally insofar as that operation is mechanical. The electrical operation of the device is as follows, reference being had to FIGS. 22 to 24.

Figure 22:
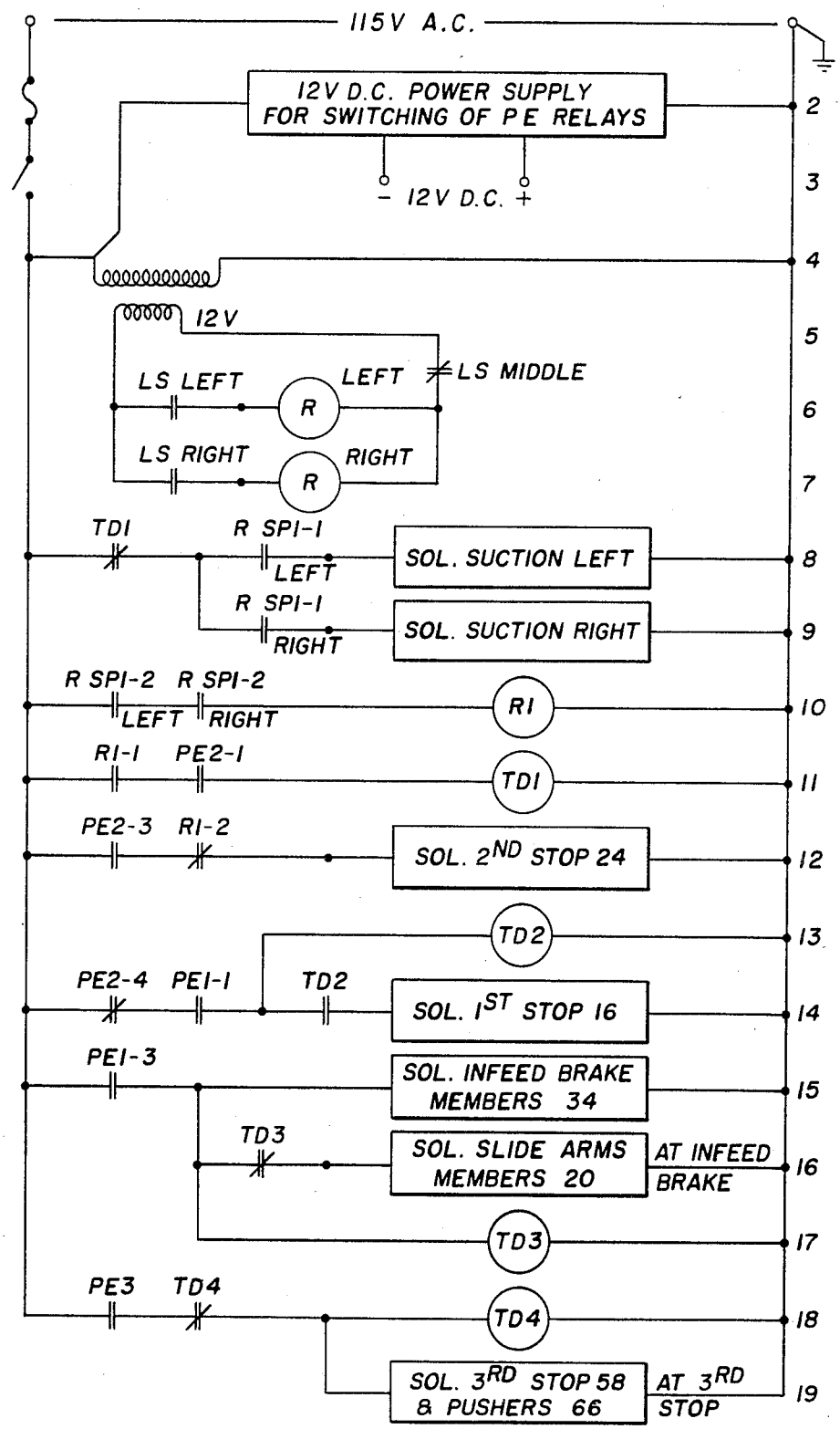
FIGS. 22 to 24 show the electrical circuits that control the apparatus.

First, FIG. 22 shows the control circuitry for the operation of the apparatus to the separator 36. In FIG. 22 SP means suction pick-up; R means relay; LS means circuit switch and PE means photo-electric eye. Scanners 18 and 28 are designated PE1 in FIG. 22, scanner 26 is PE2 and scanner 62 is PE3.

With power switched on at the ON/OFF switch and no blanks feeding the following conditions exit: None of the photo-electric (PE) switches or limit switches (LS) are activated and the controlled components of the apparatus are in the following condition:

Chain 8: Running.
Air pressure: ON.
Suction power: ON.
Control power: 110 v: ON.
12 v DC for scanners: ON.
Members 34: Down.
Side members 20: OUT
1st stop 16: UP.
2nd stop 24: UP.
Valve 42 for suction pick up: Closed.
Pushers 66: OUT.
3rd Stop 58: Down Logic Sequence Blanks, single and double, are placed crossways and in a row at position A making sure of a small spacing between them of two inches or more.

As the first blanks reach scanners 18 and 28 (PE1) the relay contacts of PE1 (lines 14 and 15) are closed. The closed contacts energize the coil of TD2 (line 13), the solenoid of the members 24 (lines 15), the solenoid of the members 20 (line 16) and the coil of TD3 (line 17). The members 24 will come up immediately and will stop all following blanks while the leading blanks travel on.

The members 20 come on slowly while the blanks will run against the 1st stop 16 which is normally in a raised position. Should the blank have been placed askew at position A they will straighten at the stop 16. The slowly incoming members 20 push the blanks to the centre of the track. To ensure that the straightened blanks leave the 1st stop 16 undisturbed TD3 (line 16) has to time out before TD2 (line 14) will time out which will release the blanks.

As the released blanks travel towards the 2nd stop 24 and reach scanner 26 (PE2) it will close its contacts in line 11 and 12 and open the contacts in line 14.

If no blank is held under the header 40 the contacts of R 1-2 in line 12 will be normally closed which energizes the solenoid of the 2nd stop 24 causing it to lower the stop 24. However, PE2 is positioned so close to the 2nd stop 24 that the blanks will run into it and be straightened before the stop 24 is actually lowered and release the blanks to travel towards the header 40 of separator 36.

At the header 40 the top blank of doubles will be lifted off the bottom blank while the bottom blank travels towards the 3rd stop 58. The top blank held at header 40 energizes the two 12 v AC relays (Rsp left/Rsp right) in line 6 and 7 via the two respective limit switches LS left and LS right. The 12 v AC relay contacts in line 8, 9 and 10 energizes the solenoids of suction left and right (line 8 and 9) and the relay coil of R1 (line 10) which closes contact R1-1 in line 11. The only way that the suction in header 40 can be released is through the open contacts of the normally closed TD1 in line 8. However, the coil of TD1 (line 11) can only be energized when another blank reaches the 2nd stop 24 and closes contacts PE2-1 (line 11).

After the set timing of TD1 the contacts of TD1 (line 8) open, de-energize the suction solenoids in line 8 and 9 which opens the limit switches in line 6 and 7. This in turn de-energizes the 12 v AC relays in line 6 and 7 reverting all its relay contacts (Rsp) in line 8, 9 and 10 to the normal position as shown in FIG. 22.

Figure 23:
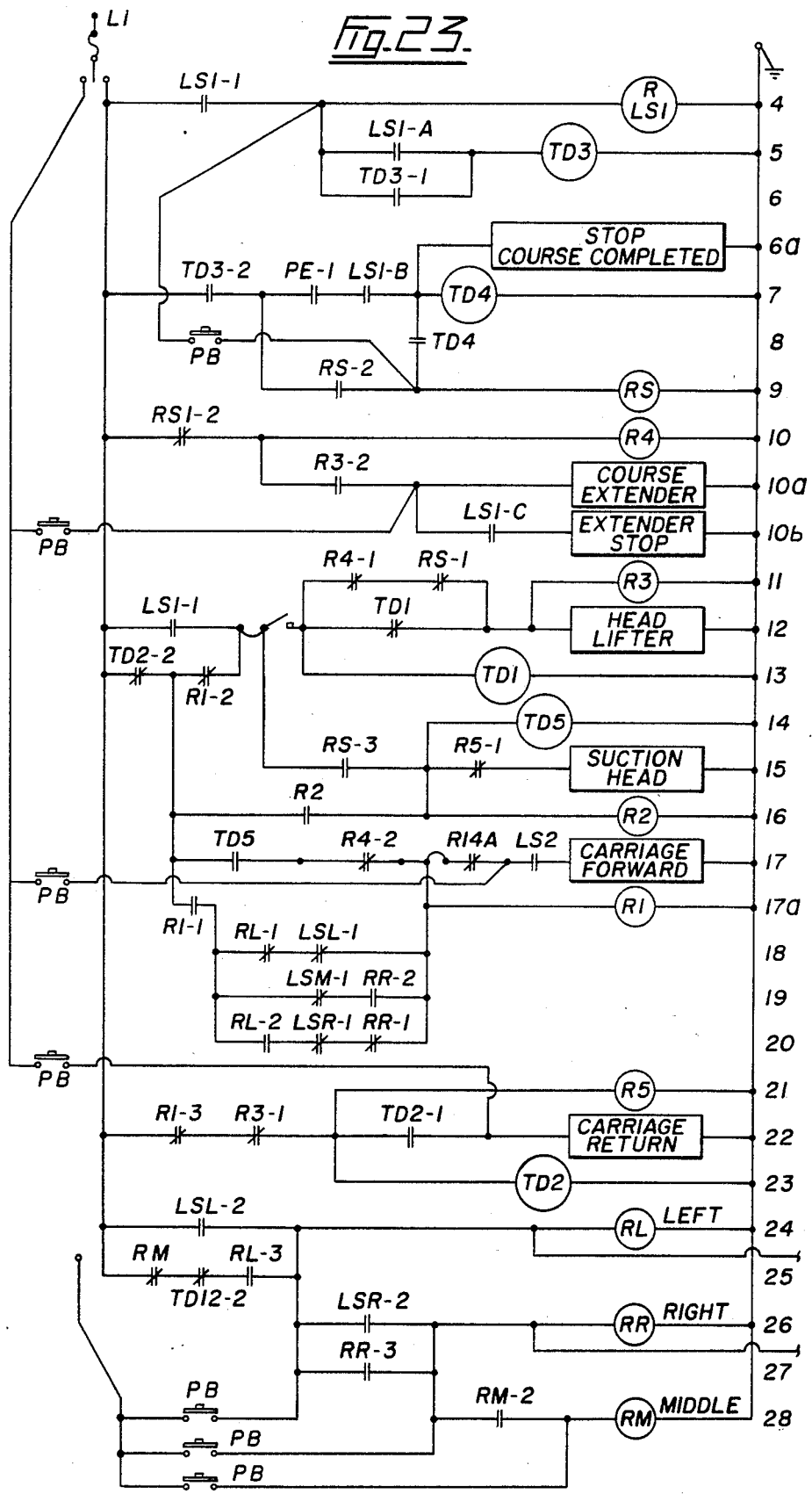
Figure 24:
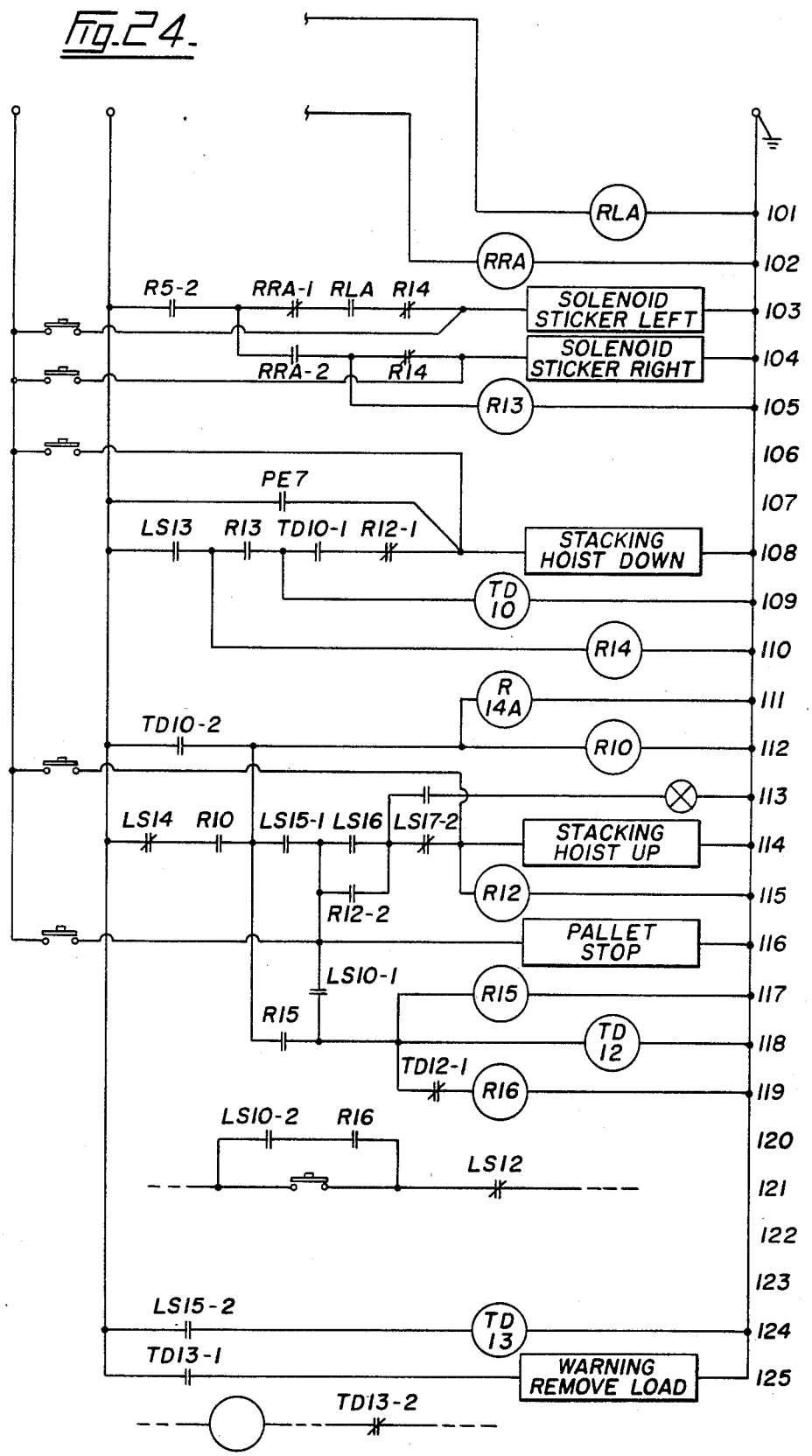

FIGS. 23 and 24 show circuits to control unloading of the blanks from the track. FIG. 23 shows circuitry to control movement of the suction box 96 to pick up blanks and move them over the track 124. FIG. 26 shows circuitry to control the provision of pallets to receive the blanks and the movement of each pallet as it is loaded.

With power on, no blanks feeding and a new pallet at the receiving station, the following conditions exit:

Chain 8: Running.
Air pressure: ON.
Suction power: ON.
Control power 110 v: ON.
12 vDC For scanners: ON.
Three phase power to pallet charger: ON.
Three phase power to Automatic sticker injector: ON.
Three phase power to Hydraulic pallet hoist: ON.
Suction chamber 96: over track.
Suction chamber lifter 114: Down.
Tongs 108 for course extender: retracted.
Hydraulic pallet hoist: UP.
Sticker injectors: tilted back.

DESCRIPTION OF LOGIC SEQUENCE-STACKER

At start of the stacking operation the suction chamber 96 has to be in the course pick up position (down) over the course assembly area at the end of the track. In this position the limit switch LS1 (line 4 and 10) and the relay R-LS1 (line 12) which doubles as LS1 determine that the suction chamber 96 should travel in the forward direction after the course has been picked up. With no blanks in the assembly area the suction chamber 96, which in the de-energized condition stays up, has now the lifter 114, powered down via the closed contacts of R-LS1 (line 12) and the N.C. (normally closed) contacts of R4 and RS1 (line 11). The N.C. contacts of TD1 (line 12) which will open after the set timing are ineffective in the course pick up position because of R4 and RS1 in line 11.

When a course has been assembled (which will be described later) the relay coil of RS (line 9) will be energized. This will start the following functions:
Contacts RS-3 (line 15) starts suction pick up and via TD5 (line 14 and 17) starts carriage forward;
contacts RS1 (line 11) brings head lifter up;
contacts RS2 (line 9) assures solid switching for all RS Contacts.

As contacts TD5 (line 17) close for carriage 122 forward the solenoid energization has to wait until the chamber lifter 114 solenoid (line 12) is de-energized. This will cause the chamber 96 to move up and close LS2 (line 17) allowing power to the chamber 96 forward solenoid.

The carriage 122 will then start in the forward direction. As the carriage 122 travels towards the pallet hoist it will have to be stopped at three positions (left, right and middle) in order to deposit the courses in the three rows as described above. The stops are fitted with limit switches $LS^L$ (line 18), $LS^M$ (line 19) and $LS^R$ (line 20). The limit switches are also present in line 24, 26 and 28 where they will set up memory sections which will determine the next limit switch to be armed for the carriage stop.

When the carriage 122 reaches the third limit switch $LS^M$ (line 28) which stops the carriage opening $LS^{M-1}$ in line 19 it will also collapse the memory sections by opening contacts $R^M$ in line 25. The next three transfer cycles will then again be left, right and middle. The actual logic switching and carriage stop selection will be as follows: Additional contacts of the memory relays are part of the switching conditions for the carriage 122 travel and together with the three limit switches they form a switching network for it.

With the memory empty $R^L$ (line 24), $R^R$ (line 26) and $R^M$ (line 28) are de-energized. At this point the R1 holding conditions (line 18) can only be set up on line 19 through the normally closed contacts of $R^{L-1}$ and N.C. contacts of $LS^{L-1}$. With R1 closed (line 17a) the power for the carriage 122 forward movement is only partially set up. As mentioned above the relay RS only presets the conditions for carriage forwad (by energizing R1 in line 17a). Only after RS-1 (line 11) has caused the head lifter to move up and close the N.O. contacts of LS2 (line 17) at the top of the lifter 114 travel can the preset power of R1 be fed to the solenoid of carriage forward (via the N.C. R14A in line 17). For all carriage stops see "Switching Sequence for Carriage Stops" below.

As the carriage 122 reaches the first limit switch LS (line 18 and 24) a number of switching conditions will change.
 (i) Carriage 122 stops.
 (ii) Suction chamber 96 moves down.
 (iii) The course is extended to 66".
 (iv) The next memory sections are set up.
 (i) Carriage Stops.

The holding circuit of R1 (line 17a) which assured continuous power to the solenoid of the forward direction during travel has now collapsed. Power to the forward direction is cut and the carriage 122 stops over the left course placing position.
 (ii) Suction Chamber Down.

With the R1 de-energized the TD1 coil (line 13) is energized and the lifter 114 is powered downwards via the N.C. contacts of TD2-2 and R1-2 (line 13) and the timed N.C. contacts of TD1 (line 12). Contacts R4-1 (line 11) are held open by the N.C. LS1-2 (line 10). The suction chamber 96 has come down and moved the course that it is carrying to within 1½" of the placing surface (empty pallet or partially built load). However, the course cannot be dropped until the blanks have been spread to the load size (66") by the tongs 108 (line 10a and 10b).
 (iii) Extending the course to 66".

As the lifter 114 gets powered downwards the parallel relay R3 (line 11) also gets energized. Power for this action is taken from LS1-2 (line 10) which in this position is N.C. and via the now closed contacts of R3-2 (line 10a). Thus the moment the lifter 114 comes down the solenoid for the tongs 108 get energized and spreads the blanks via shoes 112. As the leading blank reaches the course length, oil that is normally being displaced from one cylinder on the one side of the suction chamber to another cylinder on the other side is blocked by the extender stop valve. In the extended position the suction chamber 96 waits for the timing out of the TD1 contacts (line 12), which will be through circuits still to be described to release the course, return the tongs 108, return the lifter 114 to up, bring on the sticker injector and return the carriage 122.

(iv) Set up a Memory Section for the Carriage Stop.

As the carriage 122 is stopped by $LS^{L\text{-}1}$ (line 18) $LS^{L\text{-}2}$ in line 24 is closed, energizing relay $R^L$ (line 24), closing contacts $R^{L\text{-}3}$ (line 25) and setting up power at terminal 12 via the N.C. $R^M$ and N.C. TD12 (line 25). The powered terminal 12 has now armed the next memory section containing $LS^{R\text{-}2}$ (line 26). The next time the carriage 122 travels in the forward direction it will find LS and LS ineffective but LS ready for action and thus stop the carriage 122 at $LS^R$. Tripping $LS^{R\text{-}2}$ (line 26) will energize $R^R$ (line 26), and close contacts $R^{R\text{-}3}$ (line 27) which will set up the next memory section with terminal 24 now powered. Terminal 24 will arm the next memory section containing $LS^{M\text{-}2}$ (line 28). The next time the carriage 122 travels in the forward direction it finds $LS^L$ and $LS^R$ ineffective but $LS^M$ ready for action. As the carriage 122 trips $LS^M$ it will stop the carriage but also energize relay $R^M$ (line 28) which will open its contacts $R^M$ (line 25) and cancel the memory sections.

The next time the carriage 122 travels forward it will find $LS^{L\text{-}2}$ (line 24) set for action as it is armed through the system power and not through a previously set up memory section.

SWITCHING SEQUENCE FOR CARRIAGE STOPS

The switching network for stopping the carriage 122 can be seen in lines 18, 19 and 20. It forms the "missing link" to the holding contacts of R1-1 (line 17a) which will keep the coil of R1 (line 17a) powered. With the memory cancelled or cleared the additional contacts of the memory relays will only allow continuity at line 18 through the N.C. contacts of $R^{1\text{-}1}$. When $LS^L$ is tripped and relay $R^L$ is energized (via $LS^{L\text{-}2}$ line 24) the additional contacts of $R^{L\text{-}1}$ and $R^{L\text{-}2}$ will come on in the reversed conditions. Continuity is now established on line 20. When $LS^R$ is tripped and relay $R^R$ is energized the additional contacts of $R^{R\text{-}1}$ and $R^{R\text{-}2}$ will reverse and set up continuity at line 19.

When $LS^M$ is tripped relay $R^M$ (line 28) will be energized, opening its contacts $R^M$ (line 25) and clear the memory.

Carriage Return

The timing out and opening of contacts TD1 in line 12 signals the start of the return for the carriage 122 and will change a number of switching conditions.

(i) Solenoid for lifter 114 (line 12) will de-energize and lift up the suction chamber 96.

(ii) Relay R3 (line 11) will be de-energized opening contacts R3-2 (line 10a) which returns the tongs 108.

(iii) At the same time R3 cycling R3-1 in line 22 will close energizing relay R5 (line 21) which will open its contacts R5-1 (line 15) that will drop the course.

(iv) Closing of contacts R3-1 (line 22) will also energize TD2 (line 23). Timing out of TD2 will close its contacts of TD2-1 (line 22) which will energize the solenoids for the carriage return and the carriage 122 will start to move in the return direction.

(v) Timing out of TD2 will also open its contacts of TD2-2 (line 13) and assure that a condition of no power feed will be maintained to the circuitry sections of lifter 114, suction chamber 96 and carriage forward. TD2-2 will also collapse the holding circuit of R2 (line 16) which has kept the solenoid of the suction chamber 96 energized during the carriage forward move.

(vi) Opening of contacts TD2-2 (line 13) also de-energizes TD1 (line 13) which returns the timed out contacts of TD1 (line 12) to normally closed and set up the lifter 114 and R3 (line 11) for energization as soon as the returning carriage 122 reaches LS1.

CARRIAGE RETURN TO COURSE PICK UP POSITION

As the returning carriage reaches LS1 contacts LS1-1 (line 4) will close while LS1-2 (line 10) will open. Closing LS1-1 will energize relay R-LS1 (line 4), close its contacts R-LS1-1 (line 12) which will power the chamber lifter 114 down and energize relay R3 (line 11). The N.C. contacts of R3-1 (line 22) will open and stop the return travel of the carriage 122. Opening of LS1-2 (line 10) will deenergize R4 which will close the N.C. contacts of R4-1 (line 11).

N.C. R4-1 via N.C. RS-1 will maintain power to keep the lifter 114 energized downwards while contacts TD1 in line 12 time out. With the suction chamber 96 in the down position and over the course assembly area the receiving position is again ready for another course pick up. As soon as relay RS (line 9) gets energized signalling the completion of another course and opening contacts RS-(line 11) a new stacking cycle will start.

Switching of Course Complete

The purpose of this circuitry section is to energize relay RS (line 7) which will start the stacking cycle. As blanks enter the empty course assembly area they will pass across PE1, then across LS1-B (both line 7) and lastly across LS1-A (line 5). Every blank travelling across LS1-A causes TD3 (line 5) to be energized for the duration of the crossing. As TD3 has to sense the partial completion of the course up to and including LS1-A the timing is set slightly longer than the widest blank would take crossing LS1-A. With TD3 energized the closed contacts of TD3-2 (line 7) are presetting the power for lines 6a, 7, 8, and 9 in order to energize TD4 (line 7), the next step. This requires that PE-1 and LS1-B be closed which can happen through the next one or two blanks. The moment TD4 gets energized the stop for course complete will also be powered and stop the next blank from entering the course assembly area.

The quickly acting suction power started by the contacts of RS (line 5) would not allow enough time for the last blank to butt up against the remaining course. Relay RS is therefore powered through N.O. contacts of TD4 (line 8) which allows the necessary time. To assure continuous power to RS while the course is being lifted off LS1-A and B (which will open them) RS will set up its own holding circuit via RS-2 (line 9). RS is now safely powered to assure its contact conditions in line 11 (RS-1) and line 15 (RS-3) which will start another stacking cycle.

Sticker Injectors

The sticker injectors left and right work in conjunction with their respective course transfers. To sense the destination of the carriage 122 and its suction chamber 96 the relays RLA and RRA have been paralleled to the respective relays of the left and right memory section. The stickers are only able to operate during the return travel of the carriage 96. R5-2 (line 103) from the stacker cabinet will assure correct cycle interlock. The contacts of RLA (line 103) and RRA-2 (line 104) will then power the sticker solenoids as they are cycled by their respective relays. As the stacking hoist lowers and reaches LS13 relay R14 will get energized and its contacts R14 in line 103 and 104 will open and dissable the solenoids of the sticker injectors. The next time RRA-2 closes it will energize R13 (line 106), close its cotacts R13 (line 108) and power the solenoid hoist down (line 108) and energize TD10 (line 109).

Pallet Hoist

During the forming of the kiln load the only hoist switching happening is the occasional hoist down switching caused by the photo-electric switch P.E.7, which keeps the top of the load at the correct working level. As the hoist moves down step by step it will—after 30 layers—trip LS13. Next time the carriage 122 travels to the far side of the load—the right side—relay R13 will be energized via RRA-2 (line 104). The timed out contacts of TD10-1 (line 108) will now—through the N.C. R12 (line 108)—power the hoist downwards.

TD10 will also—after timing out—close its contacts TD10-2 (line 112) which will preset the remaining circuitry (from line 111 to 124) for further action. The closing contacts of TD10-2 will energize R10 (line 112) and set up holding power at terminal 123 (line 114) via the N.C. contacts of LS14. No power can be fed to the remaining circuitry (line 113 to 124) until the outfeeding load trips LS15 at the end of the load outfeed table. With the finished load clear of the pallet hoist a new pallet is needed from the pallet charger. The closed LS15 via the already closed LS10 (line 117, at the tilt down end of the hoist) will power the circuitry section for the control of the pallet charger, line 117 to 120. R15 (line 117) safeguards for possible erratic switching of LS15 by setting up a holding circuit across LS15 via its contacts of N.O. R15 (line 118). Also safeguarding for any debris pushing ahead of the outfeeding load and tripping LS15 prematurly the magnet can only be powered via the timed R16 (line 119 to 120). In line 120 the series switching of LS10-2 and R16 are bridging the starter push button of line 121. With LS10-2 already closed the energizing of R16 will start the pallet charger. After a pallet has been fed out the magnet shuts itself off through LS12.

The discharged pallet moves down the inclined hoist roller case. As R15 was energized the solenoid for pallet stop (line 116) was also powered which brought up the pallet stop. Before the pallet can hit the stop it will trip LS16 (line 114) which was preset by LS15. The solenoid for hoist up can now be energized via the N.C. LS7.

The hoist carrying the new pallet is now in the upward movement. When the carriage returned from its last course deposit before the hoist lowered TD10-2 opened because of the de-energization of R13 (line 106). The hoist up power is now carried by LS14 (line 114). As the hoist trips LS14 at the top travel it will cancel all power to the circuitry section of lines 111 to 121. The hoist and its new pallet is now ready to receive blank courses.

DISABLING CARRIAGE FORWARD DURING LOAD OUTFEED

As a new pallet will not be in place in time for a regular course deposit a disable for carriage forward will take place. As the first part of the circuitry section for load outfeed (line 112) gets powered the contacts of the parallel powered R14A will prevent power from reaching the solenoid for carriage forward in line 17 of the stacker cabinet. As the rising hoist opens LS14 and cancels power to lines 111 to 121 the relay R14A will be de-energized as well, and power to carriage forward will be established again. To lose as little time as possible during a load outfeed the carriage 122 will return from its last course deposit, lower suction chamber 96, pick up the first course for the new load, lift up the suction chamber 96 with its course and wait in this position until R14A closes (new pallet in place). While the first course is in holding position the waiting time is used to assemble the second course. Building of another kiln load is now under way.

When a pallet is filled it may be moved to the kiln for drying.

I claim:

1. Apparatus to move rectangular blanks from a receiving station to a loading station, the apparatus comprising:
   a support framework;
   a driven track to move the blanks from the receiving station towards the loading station;
   a feed station to receive the blanks;
   alignment means in the feeding station to position a blank;
   means to prevent a blank moving along the feed station while a further blank is in the alignment means;
   a separator to separate any blanks which are stacked on top of each other;
   a first scanner system to detect blanks of a predetermined width;
   a magazine to store blanks detected by the first scanner system;
   first transfer means to move blanks detected by the first scanner system from the track to the magazine;
   an end stop on the track for stopping the blanks and forming a course;
   second transfer means over the track, before the end stop, and dimensioned to receive said course of blanks;
   a second scanner system, remote from the end stop, to determine how a pratially formed course of blanks should be completed;
   third transfer means to remove a blank from the magazine to the track if the second scanner system indicates a blank of the predetermined width is required to complete the course;
   the second scanner system also acting to indicate a full course of blanks beneath the second transfer means; and
   means responsive to the second scanner system to move the transfer means to transfer a course of blanks to the loading station.

2. Apparatus as claimed in claim 1 in which the track comprises a driven chain.

3. Apparatus as claimed in claim 2 in which the track comprises two driven chains, a first chain in the feed station and a second chain extending to the end stop from the end of the feed station, the first chain moving more slowly than the second chain.

4. Apparatus as claimed in claim 1 in which the alignment means in the feeding station comprises a further scanner to detect the presence of a blank;
   a first stop reciprocable from a position where it blocks the track to a position where it clears the tracks;

side members reciprocable on each side of the track, from a first position parallel to the track where the side members contact and position the ends of a blank to a second position clear of the track; and a first stop and side members being operable upon a signal from said further scanner.

5. Apparatus as claimed in claim 1 in which the means to prevent a blank moving along the feed station while a further blank is in the alignment means comprises a scanner positioned to detect a blank in the alignment means;

lifting means associated with the feed station and reciprocable between a raised position, protruding above the track to a lowered position beneath the track;

the lifting means being operable by a signal from said scanner positioned to detect a blank in the alignment means, indicating the presence of a blank in the alignment means to lift any blanks in the feed station out of contact with the driven track.

6. Apparatus as claimed in claim 1 in which the separator comprises a freely suspended member having a lower surface to contact stacked blanks tapering from a leading edge high point to a low point equal to the thickness of two blanks to move stacked blanks parallel to each other;

retaining means adjacent the freely suspended member;

height sensing means operable by a stacked upper blank to operate the retaining means to retain the upper blank.

7. Apparatus as claimed in claim 6 in which the retaining means comprises a suction box;

a flap valve in the box;

the height sensing means acting to open the flap valve to expose the upper blank to suction.

8. Apparatus as claimed in claim 1 in which the first scanner system comprises a pair of scanners spaced by an amount slightly greater than the predetermined width.

9. Apparatus as claimed in claim 8 in which the first transfer means comprises a lifting device to receive a signal from the first scanner to move a block to the magazine.

10. Apparatus as claimed in claim 9 in which the first transfer means comprises a suction box;

a flap valve within the suction box to allow pick up of a blank and release of a blank; and means to move the suction box to the magazine to deposite the blank.

11. Apparatus as claimed in claim 9 in which the third transfer means includes means to eject the blank from the magazine onto the track on receipt of a signal from the second scanner system.

12. Apparatus as claimed in claim 1 in which the second transfer means comprises a suction chamber reciprocable upwardly and downwardly to collect and raise a course of blanks.

13. Apparatus as claimed in claim 12 in which the suction chamber is mounted to reciprocate from the track end to the loading station.

14. Apparatus as claimed in claim 13 in which the suction chamber includes a valve to regulate applied suction, first to pick up a course from the track and, secondly to deposit the course at the loading station.

15. Apparatus as claimed in claim 13 in which the suction chamber is mounted on a second track to move laterally of the driven track.

16. Apparatus as claimed in claim 15 including rams to reciprocate the suction chamber along the second track.

17. Apparatus as claimed in claim 16 in which the rams drive through pulleys.

18. Apparatus as claimed in claim 16 including means to control suction chamber travel so that blanks are laid down in a predetermined pattern.

19. Apparatus as claimed in claim 18 in which the predetermined pattern includes spacers to permit airflow between the blanks.

20. Apparatus as claimed in claim 19 in which each layer comprises a central course supporting an outer course on each of its edges.

21. Apparatus as claimed in claim 20 including means to provide spacers to support each outer edge of each outer course.

22. Apparatus as claimed in claim 20 in which the means to provide spacers comprises an apparatus on each side of the load station, each apparatus comprising:

a driven endless chain;

cleats for carrying spacers on the chain;

a driven endless belt to receive spacers from the chain and to move them to an ejection position;

means to pivot the apparatus between a first position away from the loading station and a second position over the loading station with the ejection position over an outer edge of an outer course;

signal means to indicate the presence of a course of blanks at the edge of the load station; and means to eject the spacers from the ejection position upon receipt of a signal from the signal means.

* * * * *